United States Patent [19]

Monroe

[11] Patent Number: 5,728,184
[45] Date of Patent: Mar. 17, 1998

[54] METHOD FOR MAKING CERAMIC MATERIALS FROM BOEHMITE

[75] Inventor: Larry D. Monroe, Eagan, Minn.

[73] Assignee: Minnesota Mining and Manufacturing Company, St. Paul, Minn.

[21] Appl. No.: 670,460

[22] Filed: Jun. 26, 1996

[51] Int. Cl.$^6$ .................. C09C 1/68; B24D 3/34
[52] U.S. Cl. .................. 51/309; 51/307; 51/308; 501/127
[58] Field of Search ............. 51/293, 307–309; 501/153, 127

[56] References Cited

U.S. PATENT DOCUMENTS

| | | |
|---|---|---|
| 4,202,870 | 5/1980 | Weber et al. . |
| 4,314,827 | 2/1982 | Leitheiser et al. . |
| 4,360,449 | 11/1982 | Oberlander et al. . |
| 4,676,928 | 6/1987 | Leach et al. . |
| 4,744,802 | 5/1988 | Schwabel . |
| 4,770,671 | 9/1988 | Monroe et al. . |
| 4,881,951 | 11/1989 | Wood et al. . |
| 5,139,978 | 8/1992 | Wood . |
| 5,178,849 | 1/1993 | Bauer . |
| 5,201,916 | 4/1993 | Berg et al. . |
| 5,213,591 | 5/1993 | Celikkaya et al. . |
| 5,259,147 | 11/1993 | Falz et al. . |
| 5,261,930 | 11/1993 | Fliedner et al. .................. 51/293 |
| 5,449,389 | 9/1995 | Yoshizumi et al. . |
| 5,496,386 | 3/1996 | Broberg et al. . |
| 5,516,348 | 5/1996 | Conwell et al. . |

FOREIGN PATENT DOCUMENTS

| | | | |
|---|---|---|---|
| 0 168 606 A1 | 1/1986 | European Pat. Off. | ........ C04B 35/10 |
| 0 293 163 A3 | 11/1988 | European Pat. Off. | ........ C04B 35/10 |
| 0 294 208 A3 | 12/1988 | European Pat. Off. | ........ C04B 35/00 |
| 394501 A | 4/1989 | European Pat. Off. . | |
| 0 324 513 | 7/1989 | European Pat. Off. | ........ C04B 35/10 |
| 0 373 765 A3 | 6/1990 | European Pat. Off. | ........ C04B 35/10 |
| 0 417 729 A3 | 3/1991 | European Pat. Off. | ......... B24D 3/14 |
| 0 441 640 A2 | 8/1991 | European Pat. Off. | ........ C04B 35/10 |
| 0 554 908 A1 | 8/1993 | European Pat. Off. | ......... C01F 7/44 |
| 41 13 476 A | 10/1992 | Germany . | |

OTHER PUBLICATIONS

Japanese Abstract No. JP63045118 1988.
Japanese Abstract No. JP860187893 1986.
Product Brochure entitled, "Versal", LaRoche Chemicals of Baton Rouge, LA, 1990.
Product Brochure entitled, "VISTA", Vista Chemical Company of Houston, TX, 1989.

*Primary Examiner*—Deborah Jones
*Attorney, Agent, or Firm*—Gregory D. Allen

[57] ABSTRACT

Method for making alpha alumina-based ceramic material (e.g., abrasive grain and fibers) from a hydrothermally treated boehmite dispersion comprising colloidal silica.

36 Claims, 1 Drawing Sheet

METHOD FOR MAKING CERAMIC MATERIALS FROM BOEHMITE

FIELD OF THE INVENTION

The present invention relates to a method for making ceramic materials (e.g., abrasive grain and fibers) from boehmite. The abrasive grain can be incorporated, for example, into abrasive products such as coated abrasive articles, bonded abrasive articles, and nonwoven abrasive articles.

DESCRIPTION OF RELATED ART

The preparation of alpha alumina-based powders (see, e.g., European Pat. Appl. No. 0 554 908 A1, published Aug. 11, 1993) and dense alpha alumina-based ceramic bodies (e.g., abrasive grain and fibers) derived from boehmite dispersions is known in the art (see, e.g., U.S. Pat. Nos. 4,314,827 (Leitheiser et al.), 4,770,671 (Monroe et al.), 4,744,802 (Schwabel), 4,881,951 (Wood et al.), and 5,139,978 (Wood), and 5,178,849 (Bauer), and European Pat. Appl. No. 0 168 606, published Jan. 22, 1986).

With regard to abrasive grain derived from boehmite dispersions, they are typically made by preparing a dispersion comprising a liquid medium (usually water), boehmite, typically a peptizing agent (usually nitric acid), and optional additives such as metal oxide (including silica, for example, colloidal silica) and/or metal oxide precursors (e.g., magnesium nitrate), followed by drying, crushing, calcining, and sintering steps (see, e.g. U.S. Pat. Nos. 4,314,827 (Leitheiser et al.) and 5,178,849 (Bauer)).

One optional additive to the dispersion is a nucleating material. A nucleating material (in some instances referred to as a seed material) typically reduces the size of the alpha alumina crystallites, and enhances the density and hardness of the resultant ceramic material (e.g., the ceramic abrasive grain). Examples of nucleating materials include alpha-$Al_2O_3$, alpha-$Fe_2O_3$, and precursors of alpha-$Fe_2O_3$.

In the preparation of fine grained, dense alpha alumina-based ceramic bodies, it is generally desirable to use finely divided starting materials. For example, when using a boehmite dispersion, the boehmite is preferably finely divided, well dispersed, and to the extent possible, free of agglomeration. One method of enhancing the dispersability of the boehmite is by hydrothermally treating the dispersion (see, e.g., U.S. Pat. Nos. 4,360,449 (Oberlander et al.) and 5,178,849 (Bauer)). The resulting dispersion generally has little or no remaining undispersed material. Care should be taken during the hydrothermal treatment because as the boehmite agglomerates are broken down, boehmite crystals may grow to an undesirably large size (see, e.g., U.S. Pat. No. 4,360,449 (Oberlander et al.)).

In the early 1980's, the assignee sold abrasive product (including coated abrasive product) having therein abrasive grain made by a sol-gel process as described, for example, in U.S. Pat. No. 4,314,827 (Leitheiser et al.), except that the boehmite dispersion (i.e., water, nitric acid, and boehmite (available at the time under the trade designation "CATAPAL SB" from Conoco of Houston, Tex.)), which did not contain silica, iron oxide, or a precursor thereof, was subjected to a hydrothermal treatment. The hydrothermal treatment was conducted at a temperature of about 120° C. and a pressure of about 29 psi for about 1 hour.

SUMMARY OF THE INVENTION

The present invention provides a method for making polycrystalline alpha alumina-based ceramic material, the method comprising the steps of:

(a) preparing a dispersion comprising a mixture comprising liquid medium, boehmite, and a silica source;

(b) hydrothermally treating the dispersion;

(c) converting the dispersion to alpha alumina-based ceramic precursor material; and (d) sintering the alpha alumina-based ceramic precursor material to provide polycrystalline alpha alumina-based ceramic material, the alpha alumina-based ceramic material having a density of at least 90 percent (preferably, at least 94 percent, more preferably, at least 95 percent, or even at least 97 percent) of theoretical density, wherein the density is at least 1 percent greater (preferably, at least 1.5 percent greater; more preferably, at least 2, 2.5, or even 3 percent greater) than the percent of theoretical density for an alpha alumina-based ceramic material made in the same manner except that the silica source is added to the dispersion between steps (b) and (c), and the alpha alumina-based ceramic material having an average alpha alumina crystallite size of less than 0.5 micrometer, the method further comprising adding a source of iron oxide to the dispersion prior to step (c).

In this application:

"Boehmite" refers to alpha alumina monohydrate and boehmite commonly referred to in the art as "pseudo" boehmite (i.e., $Al_2O_3 \cdot xH_2O$, wherein x=1 to 2).

"Hydrothermal treating" refers to the process of heating a dispersion of boehmite at a temperature (typically in the range from about 125° C. to about 225° C., preferably in the range from about 150° C. to about 200° C.) and at a pressure (typically in the range from about 5.15 kg/cm² (0.5 MPa) to about 20.6 kg/cm² (2 MPa)) for a sufficient time (typically about 10 minutes to about 8 hours) to increase the dispersability of the boehmite in the dispersion.

"Ceramic precursor material" or "unsintered ceramic material" refers to dried alumina-based dispersion (i.e., "dried ceramic precursor material") or calcined alumina-based dispersion (i.e., "calcined ceramic precursor material"), which in the case of abrasive grain is typically in the form of particles, that have a density of less than 80% (typically less than 60%) of theoretical, and are capable of being sintered and/or impregnated with an impregnation composition and then sintered to provide alpha alumina-based ceramic material.

"Alpha alumina-based ceramic material" as used herein refers to sintered ceramic material that has been sintered to a density of at least 90% (preferably, at least 94%, more preferably, at least 95%, or even at least 97%) of theoretical, and contain, on a theoretical oxide basis, at least 60% by weight $Al_2O_3$, wherein at least 50% by weight of the $Al_2O_3$ is present as alpha alumina.

"Dispersion" or "sol" refers to a solid-in-liquid two-phase system wherein one phase comprises finely divided particles (in the colloidal size range) distributed throughout a liquid. A "stable dispersion" or "stable sol" refers to a dispersion or sol from which the solids do not appear, by visual inspection, to begin to separate or settle upon standing undisturbed.

"Dispersability value" refers to the dispersability of the boehmite and is determined as follows: 270 grams of deionized water heated to 65° C., nitric acid, and 30 grams of the boehmite are added to a 1000 ml glass beaker; available under the trade designation "KIMAX #14000" from the Kimble Glass Division of Owens-Illinois Co. of Toledo, Ohio). The amount of nitric acid (70% by weight concentrate) added is sufficient to provide the water/acid/boehmite mixture with a pH of 1.6 to 2.0. The water/acid/boehmite mixture is stirred using a conventional magnetic stir bar (number 3 magnetic stir bar; 5.1 cm (2 inch)) and a conventional hot plate equipped with a magnetic stirrer. The water/acid/boehmite mixture is stirred for 15 minutes, while maintaining the 65° C. temperature.

The solids content (hereafter referred to "original % solids") of the resulting dispersion is determined by heating 10 grams of the dispersion in a conventional moisture determining balance (model #6010PC; available under the trade designation "Moisture Determining Balance" from Ohaus Scale Corporation of Florham Park, N.J.). The remainder of the dispersion is centrifuged at 1200 gravities for 10 minutes in a conventional centrifuge (available under the trade designation "IEC CENTRA-7" from the IEC Division of the Damon Corporation, Needham, Mass.). The solids content of ten grams of the supernatant (hereafter referred to "supernatant % solids") is determined using the moisture determining balance. The dispersability value is then calculated by dividing the supernatant % solids by the original % solids.

"Colloidal silica" refers to discrete, finely divided particles of amorphous $SiO_2$ having one or more of their dimensions within a range of about 3 nanometers to about 1 micrometer.

"Nucleating material" refers to material that enhances the transformation of transitional alumina(s) to alpha alumina. The nucleating material can be a nucleating agent itself or a precursor thereof.

"Sintering" refers to a process of heating at a temperature below the melting temperature of the material being heated to provide densification and crystallite growth to in turn provide a tough, hard, and chemically resistant ceramic material. The alpha alumina-based ceramic material made according to the method of the present invention is not made by a fusion process wherein heating is carried out at a temperature above the melting temperature of the material being heated.

"Solution" refers to a true solution, which is a substantially uniformly dispersed mixture at the molecular or ionic level of one or more solutes in one or more solvents.

DETAILED DESCRIPTION OF PREFERRED EMBODIMENTS

Figure 1:
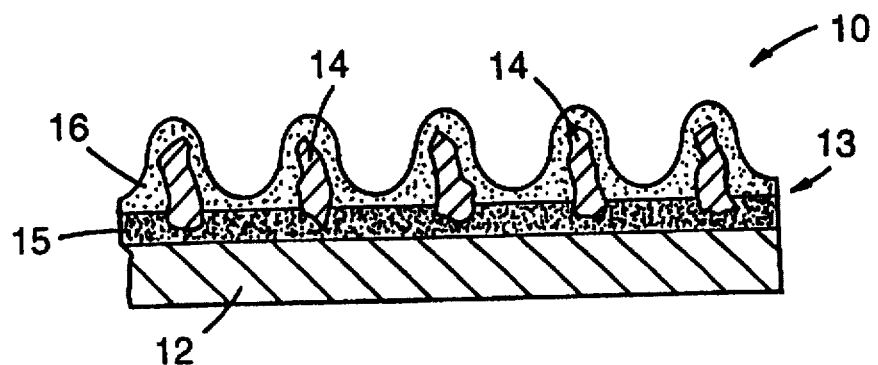
FIG. 1 is a fragmentary cross-sectional schematic view of a coated abrasive article including abrasive grain made according to the method of the present invention.

Ceramic material that can be made by the method according to the present invention includes abrasive grain and fibers. The abrasive grain can be incorporated, for example, into abrasive products such as coated abrasive articles, bonded abrasive articles, and nonwoven abrasive articles.

The liquid medium in which the boehmite is dispersed is typically water (preferably deionized water), although organic solvents, such as lower alcohols (typically $C_{1-6}$ alcohols), hexane, or heptane, may also be useful as the liquid medium. Typically, the dispersion comprises at least about 10 wt-% (preferably, about 15–40 wt-%) liquid medium, based on the total weight of the dispersion.

Boehmite

Suitable boehmite, which may have a dispersability value of 100%, 99%, 98%, 70%, or even, 45%, can be prepared using various techniques known in the art (see, e.g., U.S. Pat. Nos. 4,202,870 (Weber et al.), and 4,676,928 (Leach et al.) the disclosures of which are incorporated herein by reference). Suitable boehmite can also be obtained from commercial sources such as Condea Chemie, GmbH of Hamburg, Germany (e.g., under the trade designation "DISPERAL" (dispersability value: 99.0%)); Vista Chemical Company of Houston, Tex. (e.g., under the trade designations "DISPAL", "CATAPAL A" (dispersability value: 93.4%), "CATAPAL B" (dispersability value: 94.9%), "CATAPAL D" (dispersability value: 98.8%)); and LaRoche Industries of Atlanta, Ga. (e.g., under the trade designations "VERSAL 150", "VERSAL 250", "VERSAL 450" (dispersability value: 77.7%), VERSAL 700" (dispersability value: 87.1%), "VERSAL 850", and "VERSAL 900). These aluminum oxide monohydrates are in the alpha form, and include relatively little, if any, hydrated phases other than monohydrates (although very small amounts of trihydrate impurities can be present in some commercial grade boehmite, which can be tolerated). They typically have a low solubility in water, and have a high surface area (typically at least about 180 $m^2/g$).

Preferably, the boehmite used in the method according to the present invention has an average ultimate particle size of less than about 20 nanometers (more preferably, less than about 12 nanometers), wherein "particle size" is defined by the longest dimension of a particle.

Iron Oxide Source

Sources of iron oxide, which in some cases may act as or provide a material that acts as, a nucleating agent (i.e., a material that enhances the transformation of transitional alumina(s) to alpha alumina), include hematite (i.e., $\alpha\text{-}Fe_2O_3$), as well as precursors thereof (i.e., goethite ($\alpha$-FeOOH), lepidocrocite ($\gamma$-FeOOH), magnetite ($Fe_3O_4$), and maghemite ($\gamma\text{-}Fe_2O_3$)). Suitable precursors of iron oxide include iron-containing material that, when heated, will convert to $\alpha\text{-}Fe_2O_3$.

Suitable iron oxide sources can be prepared by a variety of techniques well known in the art. For example, a dispersion of hematite ($\alpha\text{-}Fe_2O_3$) can be prepared by the thermal treatment of iron nitrate solutions, as is described, for example, by E. Matijevic et al., *J. Colloidal Interface Science*, 63, 509–24 (1978), and B. Voight et al., *Crystal Research Technology*, 21, 1177–83 (1986), the teachings of which are incorporated herein by reference. Lepidocrocite ($\gamma$-FeOOH) can be prepared, for example, by the oxidation of $Fe(OH)_2$ with a $NaNO_2$ solution. Maghemite ($\gamma\text{-}Fe_2O_3$) can be obtained, for example, by dehydrating $\gamma$-FeOOH in a vacuum. $\gamma$-FeOOH can also be converted to $\alpha\text{-}Fe_2O_3$, for example, by heating or grinding $\gamma$-FeOOH in air. Goethite ($\alpha$-FeOOH) can be synthesized, for example, by air oxidation of ferrous hydroxide or by aging a dispersion of ferric hydroxide at an elevated temperature and high pH. Additional information on the preparation of oxides of iron can be found, for example, in the articles by R. N. Sylva, *Rev. Pure Applied Chemistry*, 22, 15 (1972), and T. Misawa et al., *Corrosion Science*, 14 131 (1974), the teachings of which are incorporated herein by reference.

The type of iron oxide source employed to make ceramic material described herein can vary. Preferably, it is a crystalline particulate material. Such particulate material can be spherical, acicular, or plate-like, depending upon the crystallinity of the particles and/or the method of preparation.

Whatever the shape of the particulate material, it preferably has a surface area of at least about 60 m$^2$/g (more preferably, at least about 80 m$^2$/g, and most preferably, at least about 100 m$^2$/g), and an average particle size of less than about 1 micrometer (more preferably, less than about 0.5 micrometer). In this context, "particle size" is defined by the longest dimension of a particle. In preferred embodiments, the crystalline particles are acicular with an aspect ratio of at least about 2:1. One particularly preferred material has acicular particles with a length of about 0.04–0.1 micrometer and a width of about 0.01–0.02 micrometer. Such particles can be obtained from a variety of suppliers of magnetic media pigment such as Magnox Pulaski, Inc., Pulaski, Va. (available, for example, as an aqueous-based paste of iron oxyhydroxide ($\alpha$-FeOOH), acicular particles with an average particle size of about 0.08 micrometer and a surface area of about 104.5 m$^2$/g under the designation "GOETHITE A").

The surface area of the particulate source of iron oxide can be measured, for example, by nitrogen absorption using a Quantasorb System OS-10 from Quantachrome Corp. of Boynton Beach, Fla. The particle size can be determined by measuring the longest dimension of the particle using a variety of techniques. For example, the particle size can be measured using a Transmission Electron Microscope, whereby a micrograph is taken of a collection of the particles at appropriate magnification and then the size of the particles is measured. Another measurement technique is Quasi Elastic Light Scattering in which a stream of light is scattered by the particles. The particle size is determined by numerical analysis of the fluctuations of the intensity of light scattered by the particles.

The presence of very small amounts of Fe$_2$O$_3$ particulate (e.g., with as little as 0.01 wt-% Fe$_2$O$_3$, on a theoretical oxide basis) is believed to aid in nucleating the transformation of transitional alumina(s) to alpha alumina. It is also believed to aid in densifying the alpha alumina at a temperature lower than densification would occur without the iron oxide (i.e., in abrasive grain made in the same manner but without the source of Fe$_2$O$_3$).

For additional details regarding the addition of iron sources to the dispersion or ceramic precursor material see, e.g., U.S. patent applications having Ser. Nos 08/670,890 and 08/670,899, each filed Jun. 26, 1996 present, the disclosures of which are incorporated herein by reference.

Silica Source

The source of silica, which is preferably amorphous silica, can include colloidal silica, precursors of colloidal silica, as well as precursors of noncolloidal silica. That is, the source of silica can be any water-soluble or water-dispersable material that when sufficiently heated forms SiO$_2$. Suitable sources of silica may include, silica sols, fumed silica, silicon halides, alkoxysilanes such as tetraethoxyorthosilane, as well as siloxane polymers and oligomers.

A precursor of colloidal silica can be, for example, any water-dispersable or water-soluble silica source that forms finely divided (1 nanometer to 1 micrometer) polymers or particles of SiO$_2$ upon heating. Although a precursor of colloidal silica is a material that is capable of forming finely divided SiO$_2$ particles, it should be understood that the precursor of colloidal silica need not form colloidal silica under the conditions of the reactions described herein. The term colloidal silica as used herein also encompasses chemical compounds colloidal in nature that comprise silicon and oxygen (e.g., colloidal clays). This term also includes coated colloidal silica, such as alumina-coated silica and zirconia-coated silica. Preferably, colloidal silica consists essentially of SiO$_2$.

Whether from colloidal silica directly, or from other forms or sources of colloidal silica, the average silica particle size is preferably less than about 150 nanometers, more preferably less than about 100 nanometers, and most preferably less than about 50 nanometers. In another aspect, the colloidal silica preferably has an average particle size in the range from about 1 to about 100 nanometers. In some instances, the silica particles can be on the order of about 3–10 nanometers. In most instances, the colloidal silica comprises a distribution or range of silica particle sizes. Amorphous silica of less than about 150 nanometers is more dispersable than is larger particle size silica, which results in more uniform ceramic material.

Typically, the source of silica is added to a liquid medium, with or without the source of iron oxide, and then combined with boehmite, which is typically in the form of a dispersion. Typically, the liquid medium is water (preferably, deionized water). More preferably, the liquid medium used to disperse the source of silica (and/or the source of iron oxide) and the liquid medium used in the boehmite dispersion are both deionized water. If colloidal silica in a liquid medium is added directly (i.e., as a dispersion rather than as a precursor solution), the percent solids in the colloidal silica dispersion is generally about 5–50% (preferably, about 15–30%), based on the total weight of the colloidal silica dispersion.

Colloidal silicas are generally prepared as basic Na$^+$ stabilized or NH$_4^+$ stabilized systems, particularly if they contain very small particles (e.g., less than about 5 nanometers). The pH of basic colloidal silica is generally within a range of about 8.5 to about 11.5, and typically about 9 to about 11. Acidic colloidal silicas are also commercially available, but they are not as stable as basic colloidal silicas. That is, acidic colloidal silicas tend to coagulate more readily than do basic colloidal silicas. Thus, in certain embodiments according to the present invention, basic colloidal silicas are preferred because of their extended shelf life. Examples of commercially available basic colloidal silicas include those available under the trade designations "NALCO 1115," "NALCO 1130," and "NALCO 2326" from Nalco Products, Inc. of Naperville, Ill. and "NYACOL 215" from Eka Nobel, Inc. of Augusta, Ga. Examples of acidic colloidal silica include those available under the trade designations "NALCO 1034A" and "NALCOAG 1056" from Nalco Products, Inc. of Naperville, Ill.

During preparation of alpha alumina-based ceramic material described herein, the colloidal silica is typically added to an acidic dispersion of boehmite or to an acidic dispersion of a source of iron oxide. For a basic colloidal silica, this can result in undesirable agglomeration and/or formation of silica flocs. Thus, it is preferable to combine a basic colloidal silica with an acid source and additional water to convert it to an acidic colloidal silica dispersion (preferably having a pH of about 1–3) prior to combining it with either boehmite or the source of iron oxide.

The iron oxide source can be added to the boehmite before or after (or both before and after) the hydrothermal treatment. In one method according to the present invention, alpha alumina-based ceramic material is made by preparing a dispersion comprising a mixture comprising a liquid medium, boehmite, and a source of silica; hydrothermally treating the dispersion; adding a source of iron oxide to the dispersion; converting the dispersion to ceramic precursor material; and sintering the ceramic precursor material to provide alpha alumina-based ceramic material. In addition, or alternatively, an iron oxide source may be added before the initial dispersion is hydrothermally heated. In certain embodiments, the step of preparing a dispersion comprises: preparing a first dispersion comprising a mixture comprising a first liquid medium and boehmite; preparing a second dispersion by combining a second liquid medium, a source of silica, and a source of iron oxide; and combining these first and second dispersions.

The presence of very small amounts of $SiO_2$ (e.g., with as little as 0.05 wt-% $SiO_2$, on a theoretical oxide basis) raises the sintering temperature, and is believed to reduce the crystallite size of the alpha alumina present in the ceramic material when compared to ceramic material made in the same manner with a source of $Fe_2O_3$ but without a source of $SiO_2$. The presence of very small amounts of $SiO_2$ (e.g., with as little as 0.05% $SiO_2$, on a theoretical oxide basis) is also believed to increase the amount of transgranular fracture of the ceramic material, and to increase at least one unit cell dimension of the crystallites in the ceramic material, when compared to ceramic material made in the same manner with a source of $Fe_2O_3$, but without a source of $SiO_2$. The presence of large amounts of silica (e.g., 8.0 wt-%), however, tends to result in significant mullite formation and poor grinding performance for abrasive grain.

A peptizing agent, also referred to as a dispersant, is typically utilized to provide the boehmite dispersion. Suitable peptizing agents include monoprotic acids and acid compounds, such as acetic, hydrochloric, formic, and nitric acid. Nitric acid is a preferred peptizing agent. Multiprotic acids are normally avoided because they typically rapidly gel the dispersion, making it difficult to handle or mix with additional components. Some commercial sources of boehmite may contain acid titer, such as absorbed formic or nitric acid, to form the dispersion.

Optional Additives

The boehmite dispersion may also contain oxide modifiers and/or other oxide additives, which may be added to enhance some desirable property of the alpha alumina-based ceramic material or to increase the effectiveness of the sintering step. For example, the addition of a metal oxide can alter the chemical and physical properties of the resulting ceramic material. Typically, the addition of a metal oxide modifier can decrease the porosity of the sintered ceramic material and thereby increase the density. The exact proportions of these components can vary depending upon the desired properties of the sintered ceramic material. Such additives to the dispersion can be made before or after the hydrothermal treatment, but are typically added after such treatment if their addition causes the dispersion to gel.

Typically, these modifiers and/or additives are in the form of a precursor of a metal oxide (e.g., a salt such as a metal nitrate or metal acetate salt) that converts to a metal oxide upon decomposition by heating. Alternatively, the metal oxide modifiers and/or additives can be added to the boehmite dispersion as a dispersion of particles in water. Also, they can be added as particulate material directly to the boehmite dispersion. In this latter method, the particulate material preferably has a particle size (i.e., the longest dimension) of less than about 5 micrometers, and more preferably, less than about 1 micrometer.

Examples of other metal oxides that may be used in the method according to the present invention, but are not necessarily desirable, include magnesium oxide (MgO), zinc oxide (ZnO), cobalt oxide (CoO), nickel oxide (NiO), zirconium oxide ($ZrO_2$), titanium oxide ($TiO_2$), iron oxide ($Fe_2O_3$), yttrium oxide ($Y_2O_3$), manganese oxide (MnO), praseodymium oxide ($Pr_2O_3$), samarium oxide ($Sm_2O_3$), ytterbium oxide ($Yb_2O_3$), neodymium oxide ($Nd_2O_3$), lanthanum oxide ($La_2O_3$), gadolinium oxide ($Gd_2O_3$), cerium oxide ($Ce_2O_3$), europium oxide ($Eu_2O_3$), dysprosium oxide ($Dy_2O_3$), erbium oxide ($Er_2O_3$), hafnium oxide ($HfO_2$), chromium oxide ($Cr_2O_3$), strontium oxide (SrO), calcium oxide (CaO), and combinations thereof. Certain of these metal oxides may react with the alumina to form a reaction product, whereas others will remain as the metal oxide. For example, the oxides of cobalt, nickel, zinc, and magnesium typically react with alumina to form a spinel, whereas zirconia and hafnia do not react with the alumina. Alternatively, the reaction product of dysprosium oxide and gadolinium oxide with aluminum oxide is generally garnet. The reaction products of praseodymium oxide, ytterbium oxide, erbium oxide, and samarium oxide with aluminum oxide generally have a perovskite and/or garnet structure. Yttria can also react with the alumina to form $Y_3Al_5O_{12}$ having a garnet crystal structure. Certain rare earth oxides and divalent metal cations react with alumina to form a rare earth aluminate represented by the formula $LnMAl_{11}O_{19}$, wherein Ln is a trivalent metal ion such as $La^{3+}$, $Nd^{3+}$, $Ce^{3+}$, $Pr^{3+}$, $Sm^{3+}$, $Gd^{3+}$, $Er^{3+}$, or $Eu^{3+}$, and M is a divalent metal cation such as $Mg^{2+}$, $Mn^{2+}$, $Ni^{2+}$, $Zn^{2+}$, or $Co^{2+}$. Such aluminates have a hexagonal crystal structure. For additional details regarding the inclusion of metal oxide (and/or precursors thereof) in a boehmite dispersion see, for example, in U.S. Pat. Nos. 4,314,827 (Leitheiser et al.), 4,770,671 (Monroe et al.), and 4,881,951 (Wood et al.), the disclosures of which are incorporated herein by reference.

If present, the additional metal oxides are typically preferably present, on a theoretical oxide basis, in the range from greater than zero to about 10 percent by weight, although the amount may vary depending, for example, on which metal oxide(s) is present.

In addition to the iron oxide source and silica source, the boehmite dispersion may contain small amounts of nucleating material such as alpha alumina. The presence of such other nucleating material depending, however, on the particular other nucleating material present, can cause a detrimental effect on the properties of the ceramic material. Therefore, adding a second nucleating material is not necessarily desirable. Further, the use of alpha aluminum oxide as a nucleating material with any significant amount of $SiO_2$ tends make it more difficult to densify the ceramic material without firing at significantly higher temperature compared to the use of an iron oxide nucleating material.

In general, the liquid medium, boehmite, and source of silica are mixed until a homogeneous mixture is formed. If a basic colloidal silica is used, it is preferably initially combined with an acid source to acidify the colloidal silica. In one embodiment, if a source of iron oxide is used, the silica source is combined with the iron oxide source in a liquid medium before it is added to the boehmite. The dispersion can be mixed or prepared by any conventional technique using, for example, a ball mill, an air stirrer, an ultrasonic mixer, a colloid mill, a continuous screw type mixer, or a screw auger. A ball mill may contain any suitable milling media such as alpha alumina milling media, or zirconia milling media.

In general, reducing the amount of air or gases entrapped in the dispersion before deliquifying tends to decrease the probability of frothing. Less entrapped gases generally produce a less porous microstructure, which is more desirable. Degasing may be accomplished, for example, by exposing the dispersion to a vacuum during preparation. Alternatively, or additionally, defoamers may be used if desired. In addition, the level of frothing may be reduced by heating the water (e.g., to a temperature of about 60°–70° C.) in which the boehmite is dispersed.

Although not wanting to be bound by theory, it is believed that the nitric acid acts as a peptizing agent breaking up boehmite agglomerates into colloidal sized material, and acts as a source of hydrogen counterions to form the colloid sized material. It is also believed that during hydrothermal treatment, the nitric acid may temporarily dissolve the boehmite and allow immediate reformation of AlOOH, usually onto another boehmite particle. Further, it is believed that the hydrothermal treatment process breaks up AlOOH agglomerates and promotes the growth of more homogeneously sized boehmite particles (see, e.g., U.S. Pat. No. 5,178,849 (Bauer), the disclosure of which is incorporated herein by reference). The latter is believed to generally result in smaller particles forming larger particles of a platelike nature (see, e.g., U.S. Pat. No. 4,360,449 (Oberlander, et al.), the disclosure of which is incorporated herein by reference). It is also believed that colloidal silica interferes with both boehmite agglomerate breakup/dissolution and with the growth of the larger particles, but that the interference with agglomerate breakup/dissolution is less than (or slower than) the interference with the large particle growth.

The dispersion typically gels prior to or during the deliquifying step. The addition of most modifiers can result in the dispersion gelling faster. Alternatively, ammonium acetate or other ionic species can be added to induce gelation of the dispersion. The pH of the dispersion and concentration of ions in the gel generally determines how fast the dispersion gels. Typically, the pH of the dispersion is within a range of about 1.5 to about 4. Typically, the pH of the dispersion after hydrothermal treatment is less than 3.3, preferably, less than 3.2, more preferably, less than 3.0, and most preferably, less than 2.8.

Hydrothermal Treatment

Methods for hydrothermally treating dispersions of boehmite at an elevated temperature are known in the art (see, e.g., U.S. Pat. Nos. 5,178,849 (Bauer) and 4,360,949 (Oberlander et al.), the disclosures of which are incorporated herein by reference). Preferably, hydrothermal treatment in the method according to the present invention is conducted by heating the boehmite/silica containing dispersion at a temperature in the range from about 150° C. to about 200° C. under a pressure in the range from about 5.15 kg/cm² (0.5 MPa) to about 20.6 kg/cm² (2 MPa)) for about 10 minutes to about 8 hours.

Deliquifying the Dispersion and Forming Dried Ceramic Precursor Material

The boehmite dispersion can be deliquified, for example, by any conventional method. Such methods include simply air drying the dispersion. Other suitable methods include dewatering methods known in the art to remove the free water of the dispersion and provide a dried ceramic precursor material. Examples of such other methods include centrifuging or filtering. Preferably, deliquifying is accomplished by heating the dispersion to promote evaporation. More preferably, the heating is carried out in a forced air oven at a temperature of about 50°–200° C. (preferably, about 100°–150° C.). Such heating can be done on a batch basis or on a continuous basis. The deliquifying step generally removes a significant portion of the liquid medium from the dispersion; however, there still may be a minor portion of the liquid medium present in the dried ceramic precursor material.

The dispersion can be formed into desired shapes using conventional techniques known in the art (see, e.g., U.S. Pat. Nos. 3,795,524 (Sowman), 4,047,965 (Karst et al.), 4,954,462 (Wood), 5,090,968 (Pellow), 5,201,916 (Berg et al.), 5,348,918 (Budd et al.), and 5,489,204 (Conwell et al.), the disclosures of which are incorporated herein by reference).

For shaped abrasive grain, the dispersion is typically partially deliquified until a plastic mass of the partially deliquified dispersion is formed. This partially deliquified plastic mass may be shaped by any convenient method such as pressing, molding, cutting, or extruding. The shaped mass is further deliquified to produce the desired shape (e.g., a rod, pyramid, triangular plate, diamond, or cone). If the shaped abrasive grain is a rod, it can have a diameter of, for example, about 20–1000 micrometers, and an aspect ratio (i.e., length to width ratio) of at least one, preferably at least two, and more preferably at least five. Irregularly shaped abrasive grain are conveniently formed by simply depositing the dispersion in any convenient size of drying vessel, such as one in the shape of a cake pan, and drying, preferably at a temperature below the frothing temperature of the dispersion.

Further, abrasive grain made according to the method of the present invention can be shaped, for example, into thin bodies having geometrical faces of triangles, squares, or filamentary or rod shapes. Examples of shaped abrasive grain are taught, for example, in U.S. Pat. Nos. 5,090,968 (Pellow) and 5,201,916 (Berg et al.), the disclosures of which are incorporated herein by reference.

Fibers can be formed from a dispersion using techniques known in the art (see, e.g., U.S. Pat. Nos. 3,795,524 (Sowman), 4,047,965 (Karst et al.), 4,954,462 (Wood), 5,090,968 (Pellow), and 5,348,918 (Budd et al.), the disclosures of which are incorporated herein by reference).

Dried ceramic precursor material (e.g., dried abrasive grain precursor) can be converted into the desired sized abrasive grain precursor by any conventional means (e.g., by crushing). A crushing step can be done by any suitable means including by hammer milling, roll crushing, or ball milling. Any method for comminuting the dried ceramic precursor material can be used. The term "crushing" is used to include all of such methods. It is much easier and requires significantly less energy to crush the dried ceramic precursor material than it does to crush sintered ceramic material. If the dried ceramic precursor material is shaped to a desired dimension and form, then the conversion step occurs during the shaping process, and crushing is not necessary.

Calcining the Dried Ceramic Precursor Material

The dried ceramic precursor material (e.g., dried abrasive grain precursor) can be further processed by calcining. Whether simply dried or dried and calcined, this material is referred to herein as an "ceramic precursor" or "unsintered ceramic precursor material." During calcining, essentially all the volatiles are removed, and the various components that were present in the dispersion are transformed into oxides. The material is generally heated to a temperature of about 400°–1000° C. (preferably, about 500°–800° C.) and held at this temperature until the free water, and preferably at least about 90 wt-% of any bound volatiles are removed. Calcining can be carried out before or after impregnation, described below, (if impregnation is carried out), or both before and after impregnation. Preferably, calcining is carried out immediately prior to sintering, whether or not an impregnation step is used.

Impregnating

Optionally, the dried or calcined material (i.e., ceramic precursor material) can be impregnated with an impregnation composition that includes metal oxide, metal oxide precursor and/or combinations thereof, and a liquid medium, to provide an impregnated abrasive grain precursor. After the impregnation step, the impregnated ceramic precursor material is typically dried, if needed, and then calcined (generally, this is the second calcining step) to form an impregnated, calcined ceramic precursor material. Further information concerning impregnation and other optional process steps coating can be found, for example, in U.S. Pat. Nos. 4,770,671 (Monroe), 5,139,978 (Wood), 5,164,348 (Wood), 5,213,591 (Celikkaya et al.) and 5,011,508 (Wald et al.), the disclosures of which are incorporated herein by reference.

Sintering

Sintering of the ceramic precursor material is usually accomplished by heating at a temperature effective to transform transitional alumina(s) into alpha alumina and to cause all of the metal oxide precursors to either react with the alumina or form metal oxide. As used herein, transitional alumina is any crystallographic form of alumina that exists after heating the hydrated alumina to remove the water of hydration prior to transformation to alpha alumina (e.g., eta, theta, delta, chi, iota, kappa, and gamma forms of alumina and intermediate combinations of such forms). The sintering temperature is typically from about 1200° C. to about 1650° C. (preferably, from about 1200° C. to about 1550° C., more preferably, from about 1300° C. to about 1450° C., and even more preferably, from about 1350° C. to about 1450° C.). The length of time which the ceramic precursor material is exposed to the sintering temperature to achieve a desired level of conversion depends on various factors, including particle size, composition of the particles, and sintering temperature. Typically, for abrasive grain, sintering can be accomplished within a period of time ranging from a few seconds to about 60 minutes. Preferably, sintering of the abrasive grain is accomplished within about 5–30 minutes.

For additional details regarding the processing of fibers (including drying, calcining, and firing or sintering), see, e.g., U.S. Pat. Nos. 3,795,524 (Sowman), 4,047,965 (Karst et al.), 4,954,462 (Wood), and 5,348,918 (Budd et al.), the disclosures of which are incorporated herein by reference.

Sintering typically is performed at atmospheric pressure, although it could be done at other pressures if desired. The sintering is preferably accomplished in an oxidizing atmosphere. Sintering of abrasive grain can occur, for example, in a rotary kiln, a batch (i.e., static) kiln, or a kiln such as described in U.S. Pat. No. 5,489,204 (Conwell et al.), the disclosure of which is incorporated herein by reference.

After sintering, the abrasive grain can be further processed by screening, or crushing and screening into the desired size distribution.

Sintered Ceramic Material

Ceramic material made according to the method of the present invention contains, on a theoretical oxide basis, alumina ($Al_2O_3$), silica ($SiO_2$), and iron oxide ($Fe_2O_3$), as well as other metal oxides for certain embodiments. The ceramic material typically has an average hardness (i.e., resistance to deformation), which is determined as described in U.S. patent applications having Ser. Nos. 09/670,890 and 08/670,899, each filed Jun. 26, 1996, the disclosures of which are incorporated herein by reference), of at least about 16 GPa; preferably, at least about 18 GPa; more preferably at least about 19 GPa; and most preferably at least about 20 GPa.

The longest dimension of the abrasive grain is typically at least about 10 micrometers. The abrasive grain described herein can be readily made with an abrasive grain size of greater than about 100 micrometers, but larger abrasive grain (e.g., greater than about 150 micrometers or even greater than about 200 micrometers) can also be readily made.

Ceramic material described herein, which have little or no glassy phases, exhibit transgranular fracture, as opposed to intergranular fracture, when the ceramic material has been sintered to a "real" density of at least 90% of theoretical. A very porous ceramic material (e.g., one having continuous porosity wherein the internal and external pores are connected such as is found in materials having a vermicular or porous non-seeded microstructure) will have a very high "apparent" density and a very high (e.g., greater than about 70%) amount of transgranular fracture. In this case, the amount of transgranular fracture is meaningless as porous material tends to fracture in a transgranular manner. It will be understood by one of skill in the art that ceramic material made according to the method of the present invention has a seeded and dense microstructure with very few connected pores (as determined by the Red Dye Test described herein below, which identifies external porosity, and/or scanning electron microscopy, which identifies both external and internal porosity). For such nonporous ceramic material, the measured or "apparent" density is a "real" density. In this case, a high amount of transgranular fracture generally indicates a tougher ceramic material with generally better grinding performance.

In certain embodiments, the ceramic material preferably contains, on a theoretical oxide basis, at least about 0.1 wt-% (more preferably, at least about 0.5 wt-%, and most preferably, at least about 1 wt-%) $SiO_2$. Furthermore, the ceramic material preferably contains, on a theoretical oxide basis, no greater than about 20 wt-% (more preferably, no greater than about 5 wt-%, and most preferably, no greater than about 3 wt-%) $SiO_2$.

In certain embodiments, the ceramic material preferably contains, on a theoretical oxide basis, at least about 0.1 wt-% (more preferably, at least about 0.5 wt-%, most preferably, at least about 1 wt-%) $Fe_2O_3$. Furthermore, the ceramic material preferably contains, on a theoretical oxide basis, no greater than about 10 wt-% (more preferably, no greater than about 5 wt-%, and most preferably, no greater than about 2 wt-%) $Fe_2O_3$.

Generally, the ceramic material made according to the method of the present invention preferably includes at least about 70 wt-% (more preferably, at least about 85 wt-%) $Al_2O_3$, based on the total weight of the ceramic material. Furthermore, the ceramic material preferably includes no greater than about 99.8 wt-% $Al_2O_3$ (more preferably, no greater than about 99 wt-%, and most preferably, no greater than about 98 wt-%), based on the total weight of the ceramic material.

Abrasive grain made according to the method of the present invention can be used in conventional abrasive products, such as coated abrasive products, bonded abrasive products (including grinding wheels, cutoff wheels, and honing stones), nonwoven abrasive products, and abrasive brushes. Typically, abrasive products (i.e., abrasive articles) include binder and abrasive grain, at least a portion of which is abrasive grain made according to the method of the present invention, secured within the abrasive product by the binder. Methods of making such abrasive products are well known to those skilled in the art. Furthermore, abrasive grain made according to the method according to the present invention, can be used in abrasive applications that utilize slurries of abrading compounds (e.g., polishing compounds).

Coated abrasive products generally include a backing, abrasive grain, and at least one binder to hold the abrasive grain onto the backing. The backing can be any suitable material, including cloth, polymeric film, fibre, nonwoven webs, paper, combinations thereof, and treated versions thereof. The binder can be any suitable binder, including an inorganic or organic binder. The abrasive grain can be present in one layer or in two layers of the coated abrasive product. Preferred methods of making coated abrasive products are described, for example, in U.S. Pat. Nos. 4,734,104 (Broberg) and 4,737,163 (Larkey), the disclosures of which are incorporated herein by reference.

The coated abrasive product can have an attachment means on its back surface to secure the coated abrasive product to a support pad or backup pad. Such attachment means can be, for example, a pressure sensitive adhesive or a loop fabric for a hook and loop attachment. The back side of the coated abrasive product may also contain a slip resistant or frictional coating. Examples of such coatings include an inorganic particulate material (e.g., calcium carbonate or quartz) dispersed in an adhesive.

An example of a coated abrasive product is depicted in FIG. 1. Referring to this figure, coated abrasive product 10 has a backing (substrate) 12 and abrasive layer 13. Abrasive layer 13 includes abrasive grain 14 secured to a major surface of backing 12 by make coat 15 and size coat 16. In some instances, a supersize coat (not shown) is used.

Figure 2:
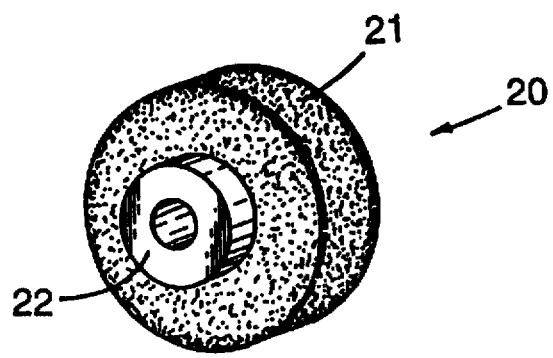
FIG. 2 is a perspective view of a bonded abrasive article including abrasive grain made according to the method of the present invention.

Bonded abrasive products typically include a shaped mass of abrasive grain held together by an organic, metallic, or vitrified binder. Such shaped mass can be, for example, in the form of a wheel, such as a grinding wheel or cutoff wheel. It can also be in the form, for example, of a honing stone or other conventional bonded abrasive shape. It is preferably in the form of a grinding wheel. Referring to FIG. 2, grinding wheel 20 is depicted, which includes abrasive grain 21, at least a portion of which is abrasive grain made according to the method of the present invention, molded in a wheel and mounted on hub 22. For further details regarding bonded abrasive products, see, for example, U.S. Pat. No. 4,997,461 (Markhoff-Matheny et al.), the disclosure of which is incorporated herein by reference. Preferred binders that can be used are curable at temperatures and under conditions that will not adversely affect the abrasive grain.

Figure 3:
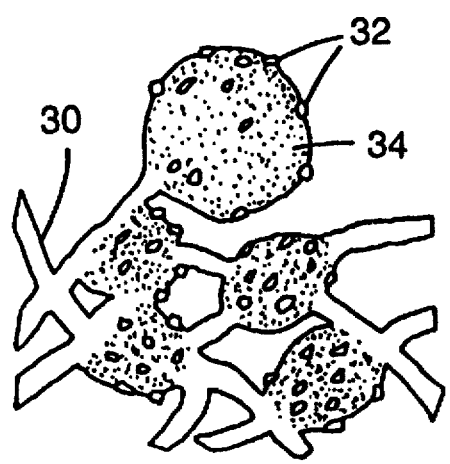
FIG. 3 is an enlarged schematic view of a nonwoven abrasive article including abrasive grain made according to the method of the present invention.

Nonwoven abrasive products typically include an open porous lofty polymer filament structure having abrasive grain distributed throughout the structure and adherently bonded therein by an organic binder. Examples of filaments include polyester fibers, polyamide fibers, and polyaramid fibers. In FIG. 3, a schematic depiction, enlarged about 100×, of a typical nonwoven abrasive product is provided. Such a nonwoven abrasive product comprises fibrous mat 30 as a substrate, onto which abrasive grain 32, at least a portion of which is abrasive grain made according to the method of the present invention, are adhered by binder 34. For further details regarding nonwoven abrasive products, see, for example, U.S. Pat. No. 2,958,593 (Hoover et al.), the disclosure of which is incorporated herein by reference.

Suitable organic binders for the abrasive products include thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant α,β-unsaturated carbonyl groups, epoxy resins, and combinations thereof. The binder and/or abrasive product can also include additives such as fibers, lubricants, wetting agents, thixotropic materials, surfactants, pigments, dyes, antistatic agents (e.g., carbon black, vanadium oxide, graphite, etc.), coupling agents (e.g., silanes, titanates, zircoaluminates, etc.), plasticizers, suspending agents, and the like. The amounts of these optional additives are selected to provide the desired properties. The coupling agents can improve adhesion to the abrasive grain and/or a filler.

The binder can also contain filler materials or grinding aids, typically in the form of a particulate material. Typically, the particulate materials are inorganic materials. Examples of particulate materials that act as fillers include metal carbonates, silica, silicates, metal sulfates, metal oxides, and the like. Examples of particulate materials that act as grinding aids include: halide salts such as sodium chloride, potassium chloride, sodium cryolite, and potassium tetrafluoroborate; metals such as tin, lead, bismuth, cobalt, antimony, iron, and titanium; organic halides such as polyvinyl chloride and tetrachloronaphthalene; sulfur and sulfur compounds; graphite; and the like. A grinding aid is a material that has a significant effect on the chemical and physical processes of abrading, which results in improved performance. In a coated abrasive product, a grinding aid is typically used in the supersize coat applied over the surface of the abrasive grain, although it can also be added to the size coat. Typically, if desired, a grinding aid is used in an amount of about 50–300 g/m$^2$ (preferably, about 80–160 g/m$^2$) of coated abrasive product.

Abrasive grain made according to the method of the present invention, can include a surface coating. Surface coatings are known to improve the adhesion between the abrasive grain and the binder in abrasive products, and in some cases to improve the abrading properties of the abrasive grain. Such surface coatings are, for example, described in U.S. Pat. Nos. 5,011,508 (Wald et al.), 5,009,675 (Kunz et al.), 4,997,461 (Markhoff-Matheny et al.), 5,213,591 (Celikkaya et al.), 5,085,671 (Martin et al.), and 5,042,991 (Kunz et al.), the disclosures of which are incorporated herein by reference.

The abrasive products can contain 100% abrasive grain made according to the method of the present invention, or they can contain a blend of abrasive grain made according to the method of the present invention with conventional abrasive grain and/or diluent particles. However, at least about 15% by weight, and preferably about 50–100% by weight, of the abrasive grain in the abrasive products should be abrasive grain made according to the method of the present invention. Examples of suitable conventional abrasive grain include fused aluminum oxide, silicon carbide, garnet, fused alumina zirconia, and other sol-gel abrasive grain, and the like. Examples of suitable diluent particles include marble, gypsum, flint, silica, iron oxide, aluminum silicate, glass, and diluent agglomerates. Abrasive grain made according to the method of the present invention can also be combined in or with abrasive agglomerates. An example of an abrasive agglomerate is described in U.S. Pat. Nos. 4,311,489 (Kressner), 4,652,275 (Bloecher et al.), and 4,799,939 (Bloecher et al.), the disclosures of which are incorporated herein by reference.

Fibers made according to the method of the present invention can be useful, for example, as thermal insulation, as a filter component, and as a reinforcement for structural composites.

Objects and advantages of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

The following designations are used in the examples:

The dispersability value for each of the following boehmite materials was determined as described above in the "Summary of the Invention" section where the term "dispersability value" is defined.

B1 alpha-alumina monohydrate (boehmite) commercially available from LaRoche Industries, Atlanta, Ga., under the trade designation "VERSAL 700"; dispersability value: 87.1%.

B2 alpha-alumina monohydrate (boehmite) commercially available from Condea Chemie, Hamburg, Germany, under the trade designation "DISPERAL"; dispersability value: 99.0%.

B3 alpha-alumina monohydrate (boehmite) commercially available from Vista Chemical Company, Houston, Tex. under the trade designation "CATAPAL B"; dispersability value: 94.9%.

B4 alpha-alumina monohydrate (boehmite) commercially available from Vista Chemical Company under the trade designation "CATAPAL A"; dispersability value: 93.4%.

B5 alpha-alumina monohydrate (boehmite) commercially available from Vista Chemical, Houston, Tex. under the trade designation "CATAPAL D"; dispersability value: 98.8%.

B6 alpha-alumina monohydrate (boehmite) commercially available from LaRoche Industries, under the trade designation "VERSAL 450"; dispersability value: 77.7%.

DWT deionized water that was at a temperature of 60°–65° C., unless otherwise specified.

$HNO_3$ nitric acid, 70% conc.

IO an iron oxyhydroxide ($\gamma$-FeOOH), aqueous dispersion (pH=5.0–5.5), about 90 to 95% of which is lepidocrocite; acicular particles with an average particle size of about 0.05 to 0.1 micrometer, a length to diameter or width ratio of about 1:1 to 2:1, and a surface area of about 115.3 m²/g.

CS1 basic colloidal silica (15% solids, 0.75% $Na_2O$) commercially available from Nalco Products, Inc., Naperville, Ill. under the trade designation "NALCO 1115;" average particle size 5 nm.

CS2 acidic colloidal silica (34% by weight solids) commercially available from Nalco Products, Inc. under the trade designation "NALCO 1034A;" average particle size 20 nm.

CS3 basic colloidal silica (30% solids, 0.65% $Na_2O$) commercially available from Nalco Products, Inc. under the trade designation "NALCO 1130;" average particle size 8 nm.

CS4 basic colloidal silica (30% solids, 0.55% $Na_2O$) commercially available from Eka Nobel, Augusta, Ga. under the trade designation "NYACOL 830;" average particle size 10 nm.

CS5 basic colloidal silica (50% solids, 0.12% $Na_2O$) commercially available from Eka Nobel, under the trade designation "NYACOL 9950;" average particle size 100 nm.

CS6 amorphous silica commercially available from Degussa Corp. Dublin, Ohio under the trade designation "AEROSIL 380".

Density

The densities of the abrasive grain for the following examples were determined with a helium gas pycnometer (available under the trade designation "Micromeritics Accu-Pyc 1330" from Micromeritics Instruments Corp., Norcross, Ga.). It is well known in the art that this helium gas pycnometer method for determining density assumes there is essentially no porosity connected to the surface of the abrasive grain.

To access the surface and internal porosity connected to the surface of selected abrasive grain, a sample of sintered abrasive grain was placed in a flask containing a red penetrating dye (available under the trade designation "P-303A Penetrant" from Uresco Androx of Cerritos, Calif.). The abrasive grain were thoroughly mixed to ensure complete coverage with the dye. The dye was then decanted off, and the abrasive grain rinsed with deionized water several times to remove the residual dye. A red color from the dye on the resulting abrasive grain denoted a highly porous abrasive grain, while abrasive grain which did not exhibit the red color were deemed to have essentially no porosity connected to the surface of the abrasive grain.

Example 1

Example 1 was prepared as follows. A dispersion was made by mixing 200 grams of B1, 24 grams of $HNO_3$, 15 grams of CS1, and 1100 grams of DWT together in a conventional 4 liter, food grade blender (Waring blender available from Waring Products Division, Dynamics Corp. of America, New Hartford, Conn.; model 34BL22(CB6)). More specifically, the water (DWT), $HNO_3$, and CS1 were placed in the blender. The blender was then turned on (low setting), the boehmite added, and the contents mixed for 30 seconds. The resulting dispersion was placed in a 2 liter, stirred, stainless steel pressure vessel (hereinafter referred to as the "Parr reactor") from Parr Instrument Company (Cat. #4522), E. Moline, Ill., heated to 150° C., and held at this temperature for 30 minutes. After heating, the vessel holding the dispersion was removed from the reactor. Cold water was run over the vessel until the interior of the vessel was at about 1 atm. The dispersion was then returned to the blender, and 4 grams of $HNO_3$ and 37 grams of IO having 5.1% iron oxide (calculated on a theoretical oxide basis as $Fe_2O_3$) were added thereto. More specifically, the dispersion was returned to the blender, and the blender was turned on (low setting). Next, the $HNO_3$ was added, followed by 15 seconds of mixing. The IO was then added, followed by 15 seconds of mixing.

The resulting dispersion was poured into a glass tray, dried overnight at about 100° C. to provide a friable solid, crushed with a pulverizer (type UA), available from Braun Corp., Los Angeles, Calif.), and screened to about 0.125 to 1 mm. The screened material was calcined in a rotary kiln (122 cm long, 15 cm inner diameter; stainless steel tube, inclined at an angle of 2.4 degrees with respect to horizontal; rotated at about 20 rpm; with a 0.3 hot zone) at about 650° C., with a residence time in the tube of about 4–5 minutes, to substantially remove the bound volatiles.

The calcined material was sintered in a rotary kiln (1.32 m long, 8.9 cm diameter; silicon carbide tube, inclined at an angle of 4.4 degrees with respect to horizontal; rotated at 3 rpm; with a 31 cm hot zone) at about 1440° C., with a hot zone residence time of about 15 minutes. The density of the Example 1 abrasive grain was 3.85 g/cm³.

Example 2

Example 2 was prepared as described for Example 1, except as follows. The amount of B1, $HNO_3$, CS1, and DWT was 250 grams, 30 grams, 20 grams, and 950 grams, respectively. After heating for 60 minutes at 150° C. in the Parr reactor, the gelled dispersion was placed back in the blender, re-liquified (i.e., converted from a gel back to a sol), and about 46 grams of IO having 5.1% iron oxide (calculated on a theoretical oxide basis as $Fe_2O_3$) were added thereto. The density of the Example 2 abrasive grain was 3.86 g/cm$^3$.

Example 3 and Comparative Example A

Example 3 was prepared as described for Example 1, except as follows. The amount of B1, HNO$_3$, CS1, and DWT was 255 grams, 31 grams, 19 grams, and 1195 grams, respectively. After heating for 60 minutes at 150° C. in the Parr reactor, the dispersion was placed back in the blender and 5 grams of HNO$_3$ and 50 grams of IO having 5.1% iron oxide (calculated on a theoretical oxide basis as $Fe_2O_3$) were added thereto. The density of the Example 3 abrasive grain was 3.85 g/cm$^3$.

Comparative Example A was prepared as described for Example 3, except the CS1 was added to the dispersion after the Parr reactor heating step. The density of the Comparative Example A abrasive grain was 3.74 g/cm$^3$.

The density of the Example 3 abrasive grain was 2.9 percent greater than that for the Comparative Example A abrasive grain.

Example 4

Example 4 was prepared as described for Example 3, except the dispersion was heated for 120 minutes at 150° C. in the Parr reactor. The density of the Example 4 abrasive grain was 3.88 g/cm$^3$.

Examples 3 and 4 abrasive grain were incorporated into coated abrasive discs and tested for grinding performance. The coated abrasive discs were made according to conventional procedures. The abrasive grain were screened to provide an approximate ANSI grade 36, wherein 100% of the abrasive grain passed through a 25 mesh screen (U.S. Standard screen with an opening size of 0.707 mm), and 50% passed through a 30 mesh screen (U.S. Standard screen with an opening size of 0.595 mm) but was retained on a 35 mesh screen (U.S. Standard screen with an opening size of 0.500 mm). The abrasive grain were bonded to 17.8 cm diameter vulcanized fiber backings (having a 2.2 cm diameter center hole) using a conventional calcium carbonate-filled phenolic make resin (48% resole phenolic resin, 52% calcium carbonate, diluted to 81% solids with water and glycol ether) and a conventional cryolite-filled phenolic size resin (32% resole phenolic resin, 2% iron oxide, 66% cryolite, diluted to 78% solids with water and glycol ether). The make resin was precured for 90 minutes at 88° C. and the size resin precured for 90 minutes at 88° C., followed by a final cure of 10 hours at 100° C.

The coated abrasive discs were tested as follows. Each coated abrasive disc was mounted on a beveled aluminum back-up pad, and used to grind the face of a preweighed 1.25 cm×18 cm 1018 mild steel workpiece. The disc was driven at 5,500 rpm while the portion of the disc overlaying the beveled edge of the back-up pad contacted the workpiece at about a 6 kg (13 pounds) load. Each disc was used to grind individual workpieces in sequence for one-minute intervals. The total cut was the sum of the amount of material removed from the workpieces throughout the test period. The performance of the abrasive grain was stated as a percent of control. That is, the total amount of metal removed for the control sample was equated to 100% and the test samples were measured relative to the 100%. There were approximately four discs per example tested. The test results for Examples 3 and 4 are listed in Table 1, below.

TABLE 1

| Example | Initial cut, g | Final cut, g | Total cut, g |
|---|---|---|---|
| 3 | 80.9 | 91.5 | 1083.7 |
| 4 | 80.7 | 85.7 | 1084.7 |

Example 5

Example 5 was prepared as described for Example 3, except that 11 grams of CS2 were used in place of the 19 grams of CS1. The density of the Example 5 abrasive grain was 3.81 g/cm$^3$.

Example 6

Example 6 was prepared as described for Example 3, except that 13 grams of CS3 were used in place of the 19 grams of CS1. The density of the Example 6 abrasive grain was 3.82 g/cm$^3$.

Example 7

Example 7 was prepared as described for Example 6, except that the dispersion was heated 40 minutes at 175° C. in the Parr reactor, the sintering kiln rotated at 4 rpm, providing a residence time in the hot zone of about 12 minutes. The density of Example 7 abrasive grain was 3.88 g/cm$^3$.

Examples 8–10

Examples 8–10 were prepared as described for Example 6, except as follows. The amounts of B1, HNO$_3$, CS3, and DWT used to prepare the dispersions were 255 grams, 31 grams, 13 grams, and 1200 grams, respectively. Example 8 was heated in the Parr reactor for 30 minutes at 175° C.; Example 9 for 15 minutes at 175° C.; and Example 10 for 1 minute at 175° C. The density of the Example 8, 9, and 10 abrasive grain were 3.87 g/cm$^3$, 3.84 g/cm$^3$, and 3.78 g/cm$^3$, respectively.

Comparative Example B

Comparative Example B was prepared by dispersing 600 grams of B2, 36 grams of HNO$_3$, 47 grams of CS1, 110 grams of IO having 5.1% iron oxide (calculated on a theoretical oxide basis as $Fe_2O_3$), and 1400 grams of DWT in the blender. The dispersion was poured into the glass trays and further processed as described in Example 1, except the sintering kiln rotated at 4 rpm, providing a residence time in the hot zone of about 12 minutes. The density of the Comparative Example B abrasive grain was 3.82 g/cm$^3$.

Comparative Example C

Comparative Example C was prepared by dispersing, in order, 1100 grams of DTW, 36 grams of HNO$_3$, 13 grams of CS3, 255 grams of B1, and 50 grams of IO having 5.1% iron oxide (calculated on a theoretical oxide basis as $Fe_2O_3$) in the blender. The dispersion was then poured into the glass trays and processed further as described for Comparative Example B. The density of the Comparative Example C abrasive grain was 3.72 g/cm$^3$.

Comparative Example D

Comparative Example D as described for Comparative Example D, except the order of additions to the blender was the DTW, HNO$_3$, B1, IO, and CS3, respectively. The density of the Comparative Example D abrasive grain was 3.68 g/cm$^3$.

Example 11

Example 11 was made by mixing 1200 grams of DTW, 15 grams of HNO$_3$, 12 grams of CS2, and 250 grams of B1 in the blender to provide a dispersion. After heating for 30 minutes at 175° C. in the Parr reactor, the dispersion was placed back in the blender, and 95 grams of IO having 2.4% iron oxide (calculated on a theoretical oxide basis as $Fe_2O_3$) and 5 grams of $HNO_3$ were added thereto. The resulting dispersion was then poured into the glass trays and processed further as for Comparative Example A. The density of the Example 11 abrasive grain was 3.78 g/cm³.

Example 12

Example 12 was prepared as described for Example 11, except that 13 grams of CS4 were used in place of the 12 grams of CS2. The density of the Example 12 abrasive grain was 3.82 g/cm³.

Example 13

Example 13 was prepared as described for Example 12, except that the 95 grams of IO were added to the Parr reactor, and only the 5 grams of $HNO_3$ (and zero grams of IO) were added after the heating in the Parr reactor (i.e., no IO was added after the heating step in the Parr reactor). The density of the Example 13 abrasive grain was 3.82 g/cm³.

Example 14 and Comparative Examples E and F

Example 14 was made by mixing 1200 grams of DTW, 250 grams of B4, 17 grams of $HNO_3$, and 13 grams of CS3 in the blender to provide a dispersion. After heating for 30 minutes at 175° C. in the Parr reactor, the dispersion was placed back in the blender, and 23 grams of IO having 10% iron oxide (calculated on a theoretical oxide basis as $Fe_2O_3$) were added thereto. The dispersion was then further processed as described in Example 7. The density of Example 14 abrasive grain was 3.90 g/cm³.

Comparative Example E was made by mixing 850 grams of DTW, 400 grams of B4, 28 grams of $HNO_3$, 20 grams of CS3, and 37 grams of IO having 10% iron oxide (calculated on a theoretical oxide basis as $Fe_2O_3$) in the blender to provide a dispersion. The resulting dispersion was poured into glass trays and further processed as described in Example 7. The density of the Comparative Example E abrasive grain was 3.77 g/cm³.

Comparative Example F was made by mixing 1200 grams of DTW, 250 grams of B4, and 17 grams of $HNO_3$ in the blender to provide a dispersion. After heating for 30 minutes at 175° C. in the Parr reactor, the dispersion was placed back in the blender, and a premixture of 30 grams of deionized water (at room temperature), 1 gram of $HNO_3$, 13 grams of CS3, and 23 grams of IO having 10% iron oxide (calculated on a theoretical oxide basis as $Fe_2O_3$) were added thereto. The dispersion was then further processed as described in Example 7. The density of the Comparative Example F abrasive grain was 3.85 g/cm3.

Comparative Example G

Comparative Example G was made by mixing 1200 grams of DTW, 250 grams of B2, 15 grams of $HNO_3$, 13 grams of CS4, and 95 grams of IO having 2.4% iron oxide (calculated on a theoretical oxide basis as $Fe_2O_3$) in the blender to form a dispersion. The resulting dispersion was poured into the glass trays and processed further as described for Example 7. The density of the Comparative Example G abrasive grain was 3.82 g/cm³.

Example 15 and Comparative Example H

Example 15 was prepared as described for Comparative Example G, except as follows. No IO was added to the initial dispersion. The dispersion was placed into the Parr reactor and heated for 30 minutes at 175° C. After heating, the 95 grams of IO were added to the dispersion. The dispersion was then poured into the glass trays and processed further as described for Comparative Example G. The density of the Example 15 abrasive grain was 3.86 g/cm³.

Comparative Example H was prepared as described for Comparative Example G, except as follows. No IO or CS4 were added to the initial dispersion. The dispersion was placed into the Parr reactor and heated for 30 minutes at 175° C. After heating, the 95 grams of IO and 13 grams of CS4 were added to the dispersion. The dispersion was then poured into the glass trays and processed further as described for Comparative Example G. The density of the Comparative Example H abrasive grain was 3.73 g/cm³.

The density of the Example 15 abrasive grain was 3.49% greater than that for the Comparative Example H abrasive grain.

Examples 16–25

Examples 16–25 were made by mixing 1200 grams of DTW, 200 grams of B1, 18 grams of $HNO_3$, and 10 grams of CS4, to provide a dispersion and then heating the dispersion in the Parr reactor according to the time and temperatures listed in Table 2, below.

TABLE 2

| Example | Time, min. | Temp., °C. | Density, g/cm³ |
|---|---|---|---|
| 16 | 70 | 175 | 3.84 |
| 17 | 70 | 125 | 3.79 |
| 18 | 70 | 175 | 3.86 |
| 19 | 100 | 200 | 3.65 |
| 20 | 10 | 175 | 3.78 |
| 21 | 40 | 200 | 3.81 |
| 22 | 100 | 150 | 3.83 |
| 23 | 130 | 175 | 3.82 |
| 24 | 40 | 150 | 3.81 |
| 25 | 70 | 225 | 3.60 |

After heating, 72 grams of IO having 2.4% iron oxide (calculated on a theoretical oxide basis as $Fe_2O_3$) were added to each dispersion. The dispersion were further processed as described for Example 7. The density of the Examples 16–25 abrasive grain are listed in Table 2, above.

Comparative Example I

Comparative Example I was prepared by mixing 1100 grams of DTW, 250 grams of B1, and 15 grams of $HNO_3$ in the blender to provide dispersion "A," and heating this dispersion in the Parr reactor for 30 minutes at 175° C. A second dispersion, "B," was prepared by mixing together 1000 grams of DTW, 130 grams of CS4, and 5 grams of $HNO_3$ in the blender, and heating this dispersion in the Parr reactor for 30 minutes at 175° C. After cooling, both dispersions, 114 grams of dispersion B and 95 grams of IO having 2.4% iron oxide (calculated on a theoretical oxide basis as $Fe_2O_3$) were added to dispersion A. The resulting dispersion was poured into the glass trays and processed further as described for Example 7. The density of the Comparative Example I abrasive grain was 3.72 g/cm³.

Example 26

Example 26 was prepared as described for Example 12. The density of the Example 26 abrasive grain was 3.80 g/cm³.

Examples 27–29

Example 27 was prepared as follows. A dispersion was made by mixing 1200 grams of DTW, 200 grams of B1, 18 grams of $HNO_3$, and 10 grams of CS4 in the blender. The dispersion was then heated in the Parr reactor for 30 minutes at 175° C. After heating, 52 grams of IO having 3.3% iron oxide (calculated on a theoretical oxide basis as $Fe_2O_3$) were added to the dispersion. The dispersion was further processed as described in Example 7. The density of the Example 27 abrasive grain was 3.78 g/cm³.

Example 28 was prepared as described for Example 27, except that 9 grams of HNO$_3$ were used in place of the 18 grams of HNO$_3$, and an additional 9 grams of HNO$_3$ were added along with the IO. The density of the Example 28 abrasive grain was 3.76 g/cm$^3$.

Example 29 was prepared as described for Example 27, except that 6 grams of HNO$_3$ were used in place of the 18 grams of HNO$_3$, and an additional 12 grams of HNO$_3$ were added along with the IO. The density of the Example 29 abrasive grain was 3.74 g/cm$^3$.

Illustrative Examples I–III, Examples 30–32, and Comparative Examples J–O

Illustrative Examples I–III and Examples 31–32 were made by mixing 1100 grams of DTW, 200 grams of B1, 10 grams of CS3, and the respective amount of HNO$_3$ listed in Table 3, below, in the blender. Each resulting dispersion was heated in the Parr reactor for 30 minutes at 175° C. After heating the percent solids dispersed in each dispersion was determined as follows. The solids content (hereafter referred to "original % solids") of the dispersion was determined by heating 10 grams of the dispersion in a conventional moisture determining balance model #6010PC; available under the trade designation "Moisture Determining Balance" from Ohaus Scale Corporation of Florham Park, N.J.). 290 grams of the dispersion was centrifuged at 1200 gravities for 10 minutes in a conventional centrifuge (available under the trade designation "IEC CENTRA-7" from the IEC Division of the Damon Corporation, Needham, Mass.). The solids content of ten grams of the supernatant (hereafter referred to "supernatant % solids") was determined using the moisture determining balance. The percent of dispersed solids was the calculated dividing the supernatant % solids by the original % solids, and are reported in Table 3, below.

TABLE 3

| Example | Amount of HNO$_3$, grams | pH after hydrothermal treatment | Percent of solids Dispersed, % | Density, g/cm$^3$ |
|---|---|---|---|---|
| Illus. I | 4 | 3.6 | 35.3 | failed red dye test |
| Comp. J | 4 | 3.6 | 60.6 | failed red dye test |
| Illus. II | 6 | 3.3 | 65.3 | failed red dye test |
| Comp. K | 6 | 3.3 | 90.5 | 3.73 |
| Illus. III | 8 | 3.2 | 89.8 | 3.77 |
| Comp. L | 8 | 3.2 | 95.6 | 3.78 |
| 30 | 10 | 3.0 | 99.3 | 3.83 |
| Comp. M | 10 | 3.0 | 98.6 | 3.82 |
| 31 | 14 | 2.8 | 98.2 | 3.86 |
| Comp. N | 14 | 2.8 | 98.8 | 3.83 |
| 32 | 20 | 2.8 | 99.3 | 3.90 |
| Comp. O | 20 | 2.8 | 96.3 | 3.84 |

The remaining amounts of each dispersion were further processed by returning each to the blender, and adding 16 grams of IO having 10% iron oxide (calculated on a theoretical oxide basis as Fe$_2$O$_3$) thereto. Each resulting dispersion was poured into glass trays and processed further as described in Example 7. Comparative Examples J–O were prepared as described for Illustrative Examples I–III and Examples 30–32, respectively, except that no silica sol was added to the dispersion prior to the hydrothermal treatment, and 8 grams of CS3 were added to each dispersion after the hydrothermal treatment. The density of Illustrative Examples I–III, Examples 30–32, and Comparative Example J–O abrasive grain are listed in Table 3, above.

Example 33 and Illustrative Examples IV–VIII

Examples 33 and Illustrative Examples IV–VIII were prepared as follows. Dispersions were made by mixing 1200 grams of DTW, 200 grams of B1, 12 grams of HNO$_3$, and CS4 in the blender, wherein the amount of CS4 was 0 grams, 1 gram, 2 grams, 5 grams, and 10 grams, respectively. Each resulting dispersion was heated in the Parr reactor for 30 minutes at 175° C. After heating, 52 grams of IO having 3.3% iron oxide (calculated on a theoretical oxide basis as Fe$_2$O$_3$) were added to each dispersion, along with sufficient amount of CS4 to bring the total amount added to each dispersion to 18 grams. The dispersions were then each further processed as described in Example 7.

The abrasive grain of Example 33 and Illustrative Examples IV–VIII were evaluated using the "Red Dye Test". The abrasive grain of Illustrative Examples IV–VIII each failed the red dye test; the abrasive grain of Example 33 passed the test. The density of the Example 33 abrasive grain was 3.78 g/cm$^3$.

Examples 34 and 35

Example 34 was prepared as follows. A dispersion was made by mixing 1100 grams of DTW, 250 grams of B1, 20 grams of HNO$_3$, and 12 grams of CS4 in the blender. The resulting dispersion was heated in the Parr reactor for 30 minutes at 175° C. After heating, 65 grams of IO having 3.3% iron oxide (calculated on a theoretical oxide basis as Fe$_2$O$_3$) were added to the dispersion. The dispersion was then further processed as described in Example 7. The density of the Example 34 abrasive grain was 3.78 g/cm$^3$.

Example 35 was prepared as described for Example 34, except that 7.2 grams of CS5 were used in place of the 12 grams of CS4. The density of the Example 35 abrasive grain was 3.78 g/cm$^3$.

Examples 36–37 and Comparative Examples P and Q

Example 36 was prepared as follows. A dispersion was made by mixing 1200 grams of DTW, 200 grams of B6, 18 grams of HNO$_3$, and 10 grams of CS3 in the blender. The resulting dispersion was heated in the Parr reactor for 30 minutes at 175° C. After heating, 18 grams of IO having 10% iron oxide (calculated on a theoretical oxide basis as Fe$_2$O$_3$) were added to the dispersion. The dispersion was then further processed as in Example 7. The density of the Example 36 abrasive grain was 3.89 g/cm$^3$.

Comparative Example P was prepared as described for Example 36, except the CS3 was added after the dispersion had been heated. The density of the Comparative Example P abrasive grain was 3.84 g/cm$^3$.

Example 37 was prepared as described for Example 36, except 3 grams of CS6 were used in place of the 10 grams of CS3, and B1 was used in place of B6. The density of the Example 37 abrasive grain was 3.77 g/cm$^3$.

Comparative Example Q was prepared as described for Example 37, except the CS6 was added after the dispersion had been heated. The Comparative Example Q abrasive grain failed the red dye test.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A method for making polycrystalline alpha alumina-based ceramic material, said method comprising the steps of:

(a) preparing a dispersion comprising a mixture comprising liquid medium, boehmite and a silica source;

(b) hydrothermally treating said dispersion;

(c) converting said dispersion to alpha alumina-based ceramic precursor material; and (d) sintering said alpha alumina-based ceramic precursor material to provide polycrystalline alpha alumina-based ceramic material, said method further comprising adding an iron oxide nucleating material to the dispersion prior to step (c), said alpha alumina-based ceramic material having an average alpha alumina crystallite size of less than 0.5 micrometer, and said alpha alumina-based ceramic material having a density of at least 90 percent of theoretical density, wherein said density is at least 1 percent greater than the percent of theoretical density for an alpha alumina-based ceramic material wherein the silica source is added to the dispersion between steps (b) and (c).

2. The method according to claim 1 wherein said liquid medium is water.

3. The method of claim 2 wherein said silica source is colloidal silica.

4. The method according to claim 3 wherein said dispersion after step (b) has a pH of less than 3.0.

5. The method according to claim 3 wherein said alpha alumina-based ceramic material has a density of at least 94 percent of theoretical.

6. The method according to claim 3 wherein said alpha alumina-based ceramic material has a density that is at least 1.5 percent greater than the density of said alpha alumina-based ceramic wherein the silica source is added to the dispersion between steps (b) and (c).

7. The method according to claim 3 wherein said alpha alumina-based ceramic material has a density that is at least 2 percent greater than the density of said alpha alumina-based ceramic wherein the silica source is added to the dispersion between steps (b) and (c).

8. The method according to claim 3 wherein said alpha alumina-based ceramic material has a density that is at least 2.5 percent greater than the density of said alpha alumina-based ceramic wherein the silica source is added to the dispersion between steps (b) and (c).

9. The method according to claim 3 wherein said alpha alumina-based ceramic material has a density that is at least 3 percent greater than the density of said alpha alumina-based ceramic wherein the silica source is added to the dispersion between steps (b) and (c).

10. The method according to claim 3 wherein step (c) includes a calcining step.

11. The method according to claim 10 wherein said boehmite has a dispersability value less than 98%.

12. The method according to claim 10 wherein said boehmite has a dispersability value less than 70%.

13. A method for making polycrystalline alpha alumina-based ceramic abrasive grain, said method comprising the steps of:

(a) preparing a dispersion comprising a mixture comprising liquid medium, boehmite and a silica source;

(b) hydrothermally treating said dispersion;

(c) converting said dispersion to alpha alumina-based ceramic abrasive grain precursor; and (d) sintering said alpha alumina-based ceramic abrasive grain precursor to provide polycrystalline alpha alumina-based ceramic abrasive grain, said method further comprising adding an iron oxide nucleating material to the dispersion prior to step (c), said alpha alumina-based ceramic abrasive grain having an average alpha alumina crystallite size of less than 0.5 micrometer, and said alpha alumina-based ceramic abrasive grain having a density of at least 90 percent of theoretical density, wherein said density is at least 1 percent greater than the percent of theoretical density for an alpha alumina-based ceramic abrasive grain wherein the silica source is added to the dispersion between steps (b) and (c).

14. The method according to claim 13 wherein said liquid medium is water.

15. The method of claim 14 wherein said silica source is colloidal silica.

16. The method according to claim 15 wherein said dispersion after step (b) has a pH of less than 3.0.

17. The method according to claim 15 wherein said alpha alumina-based ceramic material has a density of at least 94 percent of theoretical.

18. The method according to claim 15 wherein said alpha alumina-based ceramic material has a density that is at least 1.5 percent greater than the density of said alpha alumina-based ceramic wherein the silica source is added to the dispersion between steps (b) and (c).

19. The method according to claim 15 wherein said alpha alumina-based ceramic material has a density that is at least 2 percent greater than the density of said alpha alumina-based ceramic wherein the silica source is added to the dispersion between steps (b) and (c).

20. The method according to claim 15 wherein said alpha alumina-based ceramic material has a density that is at least 2.5 percent greater than the density of said alpha alumina-based ceramic wherein the silica source is added to the dispersion between steps (b) and (c).

21. The method according to claim 15 wherein said alpha alumina-based ceramic material has a density that is at least 3 percent greater than the density of said alpha alumina-based ceramic wherein the silica source is added to the dispersion between steps (b) and (c).

22. The method according to claim 15 wherein step (c) includes a calcining step.

23. The method according to claim 22 wherein said boehmite has a dispersability value less than 98%.

24. The method according to claim 22 wherein said boehmite has a dispersability value less than 70%.

25. The method according to claim 15 wherein said colloidal silica has an average particle size in the range from about 1 to about 100 nm.

26. The method according to claim 15 wherein said hydrothermal treating is conducted at at least one temperature in the range from about 150° C. to about 200° C., and wherein said hydrothermal treating is conducted for at least 10 minutes.

27. The method according to claim 15 wherein said sintering is conducted at a temperature in the range from about 1200° C. to about 1450° C.

28. The method according to claim 15 wherein said sintering is conducted at a temperature in the range from about 1350° C. to about 1450° C.

29. The method according to claim 15 wherein said dispersion further comprises at least one precursor of an oxide selected from the group consisting of magnesium oxide, cobalt oxide, nickel oxide, cerium oxide, zirconium oxide, hafnium oxide, lithium oxide, manganese oxide, chromium oxide, yttrium oxide, praseodymium oxide, samarium oxide, ytterbium oxide, neodymium oxide, lanthanum oxide, gadolinium oxide, dysprosium oxide, erbium oxide, europium oxide, and titanium oxide.

30. A method for making an abrasive article, said method comprising the steps of:

(a) preparing a dispersion comprising a mixture comprising liquid medium, boehmite, and a silica source;

(b) hydrothermally treating said dispersion;

(c) converting the dispersion to abrasive grain precursor;

(d) sintering said alpha alumina-based ceramic abrasive grain precursor to provide polycrystalline alpha alumina-based ceramic abrasive grain, said alpha alumina-based ceramic abrasive grain having an average alpha alumina crystallite size of less than 0.5 micrometer, and said alpha alumina-based ceramic abrasive grain having a density of at least 90 percent of theoretical density, wherein said density is at least 1 percent greater than the percent of theoretical density for an alpha alumina-based ceramic abrasive grain wherein the silica source is added to the dispersion between steps (b) and (c); and (e) incorporating the alpha alumina-based abrasive grain provided by steps (a)–(d) into an abrasive article comprising a binder, wherein said method further comprises adding an iron oxide nucleating material to the dispersion prior to step (c).

31. The method according to claim 30 wherein said liquid medium is water.

32. The method of claim 31 wherein said silica source is colloidal silica.

33. The method according to claim 32 wherein after step (b) said dispersion has a pH of less than 3.0.

34. The method according to claim 1 further comprising the step of impregnating said precursor material with an impregnation composition comprising liquid medium and metal oxide precursor.

35. The method according to claim 13 further comprising the step of impregnating said precursor material with an impregnation composition comprising liquid medium and metal oxide precursor.

36. The method according to claim 30 further comprising the step of impregnating said precursor material with an impregnation composition comprising liquid medium and metal oxide precursor.

* * * * *

UNITED STATES PATENT AND TRADEMARK OFFICE
CERTIFICATE OF CORRECTION

PATENT NO. : 5,728,184
DATED : March 17, 1998
INVENTOR(S) : Larry D. Monroe

It is certified that error appears in the above-identified patent and that said Letters Patent is hereby corrected as shown below:

Column 4,
Line 17, "VERSAL 700"" should read -- "VERSAL 700" --.
Line 18, ""VERSAL 900)." should read -- "VERSAL 900"). --.

Column 8,
Line 46, following "tends" and before "make" insert -- to --.

Column 11,
Line 60, "09/670,890" should read -- 08/670,890 --.
Line 61, "08/670,899" should read -- 08/670,889 --.

Column 18,
Line 59, "D" should read -- C --.

Signed and Sealed this

Fifth Day of February, 2002

*Attest:*

JAMES E. ROGAN
*Attesting Officer*     *Director of the United States Patent and Trademark Office*